June 15, 1937.  D. W. LEVANDOWSKY  2,083,571
METHOD AND APPARATUS FOR PLANTING AND TRANSPLANTING
Filed Nov. 2, 1936

Inventor:
DANIEL W. LEVANDOWSKY

By *[signature]*
Attorney.

Patented June 15, 1937

2,083,571

UNITED STATES PATENT OFFICE 2,083,571

METHOD AND APPARATUS FOR PLANTING AND TRANSPLANTING

Daniel W. Levandowsky, Front Royal, Va.

Application November 2, 1936, Serial No. 108,839

2 Claims. (Cl. 47—37)

(Granted under the act of March 3, 1883, as amended April 30, 1928; 370 O. G. 757)

The invention described may be manufactured and used by or for the Government for governmental purposes without the payment to me of any royalty thereon.

This invention relates to a method of and apparatus for planting and has for its object to provide a suitable container in which seeds or young plants in soil may be grown and the container subsequently partially expanded to act as a guard against soil erosion as the container and plant are permanently deposited in the ground.

The invention contemplates the use of tin cans or other receptacles, preferably metallic. Sufficient soil is placed therein for the seeds or young plants in the can. The cans are slotted, or perforated, so that they may be opened or partially expanded transversely. The can in this opened condition may then act as a guard for the plant against soil erosion as the can and its soil and plant contents are permanently placed in the ground.

The invention is further set forth in the following specification and appended claims certain embodiments thereof being illustrated in the accompanying drawing, in which:

Figure 1:
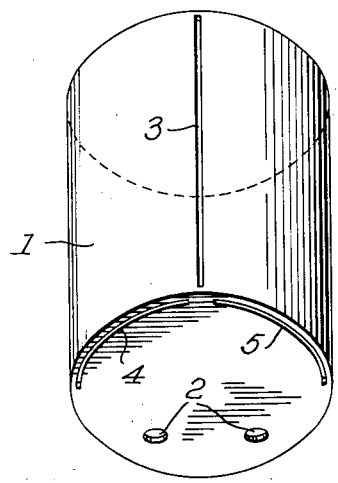
Figure 1 is a view in perspective of the container showing one form of slots by means of which it is made frangible.
Figure 2:
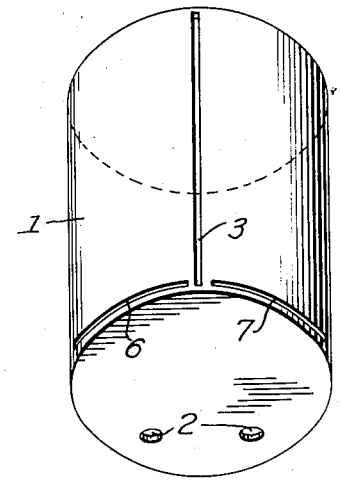
Figure 2 is a similar view showing a different slotting.
Figure 3:
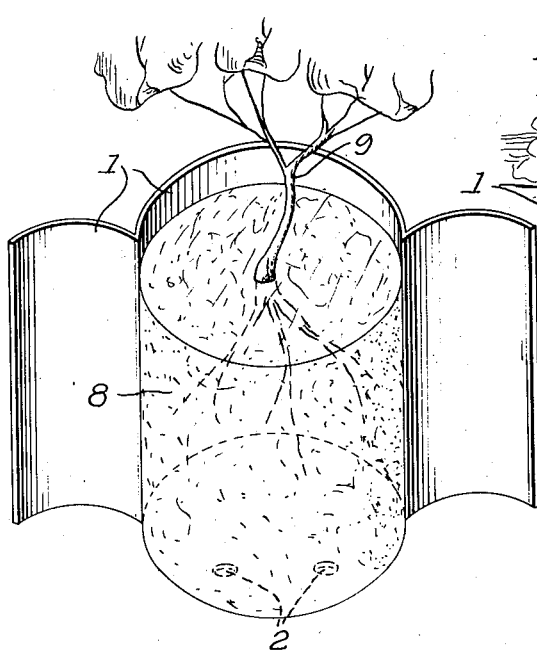
Figure 3 is a view in perspective of the container opened and the soil and plant which it enveloped before being opened.
Figure 4:
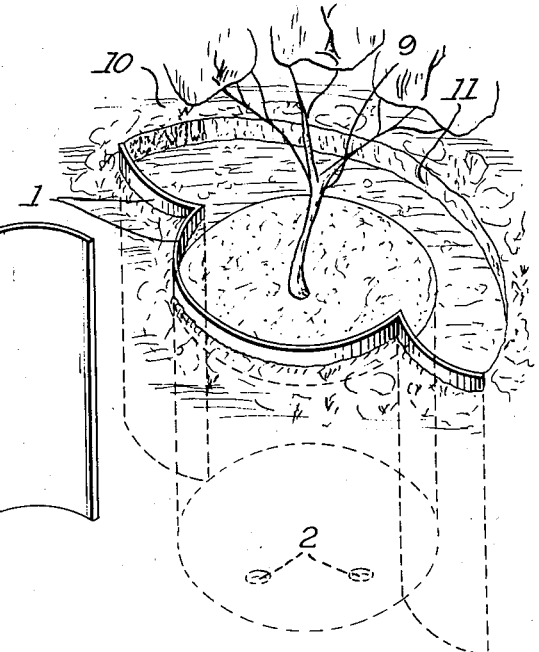
Figure 4 is a view in perspective of that shown in Figure 3 deposited in the ground.

Referring more particularly to the drawing, the container 1 may be cylindrical with one end open and the other closed with drain holes 2. The can is either perforated or slotted longitudinally substantially throughout its length at 3 and also on its bottom as at 4 and 5, or on its sides as at 6 and 7. The adjacent ends of slots 4 and 5 or 6 and 7 are adjacent the bottom of slot 3 so that with little effort the can may be opened and folded back as shown in Figures 3 and 4.

Either seed or a young plant is deposited with sufficient soil in the container and allowed to grow therein. When the plant is sufficiently grown for permanent planting the can is opened along the slots and folded back as shown in Figure 3. The soil 8 has become compact and the soil and plant 9 with careful handling may be kept intact as they are bodily placed with the can in the ground as shown in Figure 4. Here the ground is shown at 10, the numeral 11 indicating the side of the hole dug therein to receive the can and plant. When the transplanting has thus been effected the hole may be filled with top soil.

The plant is thus released from the major portion of its confinement in the can, while the latter in its opened condition acts as an effective guard against soil erosion. This is particularly true in roadside or other landscaping where planting is done on a sloping terrain.

By this simple construction, use may be made of cans that would otherwise be disposed of. Moreover, the transplanting may be effected with the minimum effort and the can itself used as a very effective guard against soil erosion.

The can not only protects the plant itself as the chief purpose of planting the can is to stop erosion of the bank. Minor erosion will be stopped immediately by the shields of the opened cans, and major erosion of the bank will be arrested much sooner due to the more rapid root-growing process of can-transplanted plants. The cans may be opened and transplanted just as soon as a root system from the seed or from a plant has developed enough to hold the earth cylinder 8. The shield created by an opened planted can catches and holds moisture, and also prevents the topsoil from being washed away from the plant. Thus it greatly helps the plant survive the hardships of the poor and dry conditions of a bank. The plant in the can may be safely transplanted at any time in the year. Moreover, no setback to the plant will occur, even at the most critical blooming period, or during hot summer weather, when usual transplanting method is practically impossible.

I claim:

1. The method of planting and transplanting comprising the planting and growing of a plant within a container and subsequently partially expanding said container and transplanting said plant by bodily depositing the plant, its soil and the container in the ground and so positioning the container as to leave the plant substantially free from confinement within but effectively guarded thereby against soil erosion.

2. For use in planting and transplanting, a container for receiving a plant and surrounding soil, said container having an open end and a perforated closed end, said container being slotted longitudinally substantially throughout its length and also adjacent its closed end throughout a portion of its lateral dimensions, the slots being so formed as to allow the container to maintain its original shape but frangible so that the container may be forced open along the slots and folded outwardly so as to act as a guard against soil erosion when the plant, its soil and said container are bodily placed in the ground in the transplanting of said plant.

DANIEL W. LEVANDOWSKY.